Oct. 18, 1955 T. L. FAWICK 2,720,957
FLUID-ACTUATED ASSEMBLY FOR CLUTCHES AND BRAKES
Filed Nov. 27, 1951
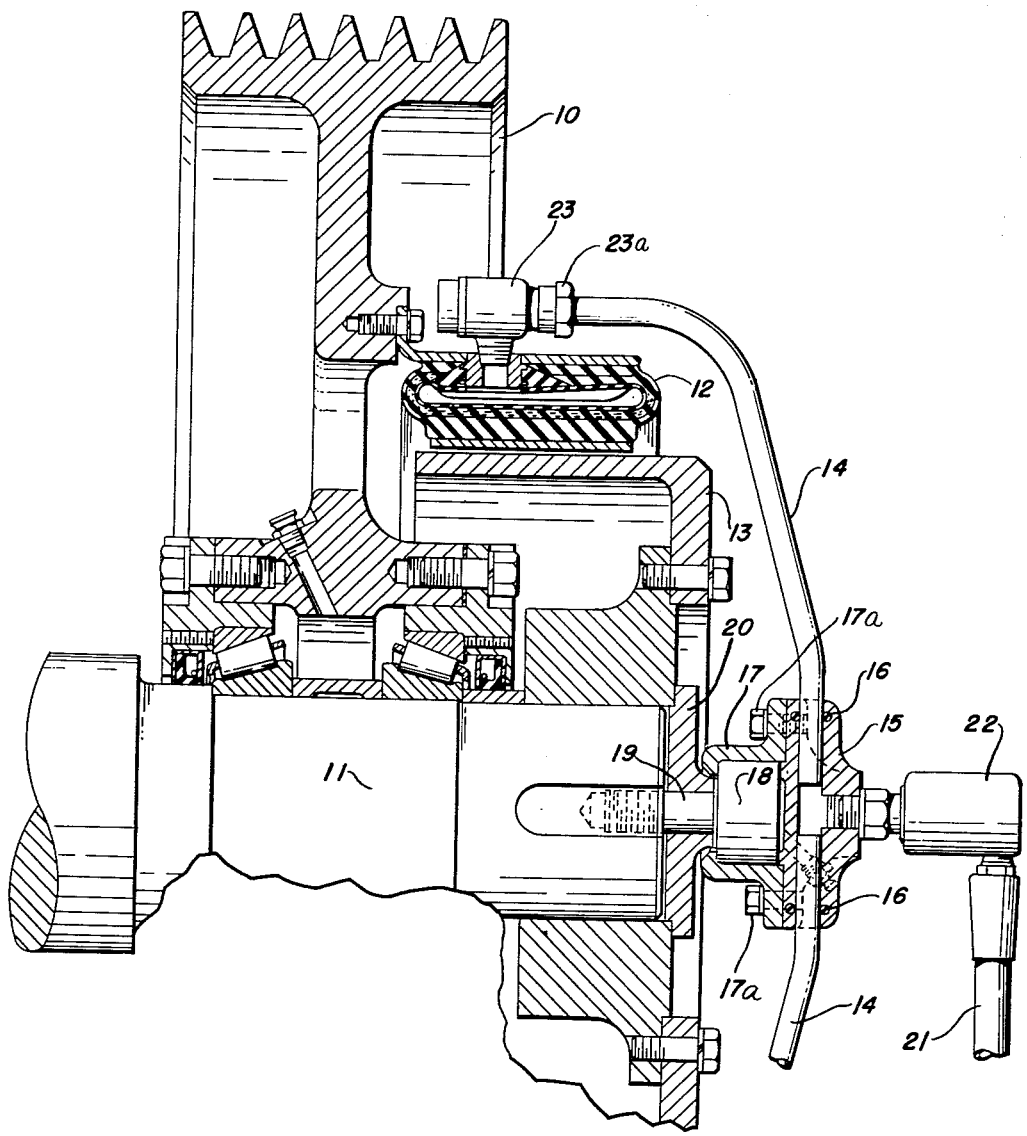
INVENTOR.
THOMAS L. FAWICK
BY Willard D. Eakin
ATTORNEY

United States Patent Office 2,720,957
Patented Oct. 18, 1955

2,720,957

FLUID-ACTUATED ASSEMBLY FOR CLUTCHES AND BRAKES

Thomas L. Fawick, Cleveland, Ohio, assignor, by mesne assignments, to Fawick Corporation, a corporation of Michigan Application November 27, 1951, Serial No. 258,487

3 Claims. (Cl. 192—88)

This invention relates to fluid-actuated assemblies for clutches and brakes and more specifically to means for charging and venting a fluid-distensible member in such an assembly.

Its chief objects are to provide improved charging and venting means having some or all of the advantages of economy of manufacture, facility of assembly and disassembly, durability, quickness in the performance of the charging and venting functions, compactness of structure, and accurate centering and freedom from whipping in rotation as to all of the parts.

A more specific object is to provide as a sub-assembly adapted for quick and easy association with the other parts a structure comprising a rotary seal for supplying distending fluid from a non-rotating supply line, a plurality of distributing pipes for conducting the fluid from the rotary seal to a plurality of inlets to the fluid-distensible member, and means for rotatably centering this sub-assembly upon the one of the two relatively rotatable structures, of the clutch or brake, upon which the fluid-distensible member is not mounted, and with relation to which the sub-assembly referred to must rotate.

The single figure of the accompanying drawing is an axial section of a clutch assembly embodying my invention but with parts broken away for avoidance of duplication of illustration.

The assembly comprises a multiple-belt pulley 10 journalled upon a shaft 11 and provided with a fluid-distensible annular bag 12 adapted to be distended inwardly, toward the axis of rotation, for frictionally gripping a drum 13 secured upon the shaft 11, and to release the drum upon being vented.

For clarity, and for accordance with usual practice, the structure comprising the pulley 10 and bag 12 will be considered herein as the continuously rotating driving structure. In that case the drum 13 can be either the driven member or can be a brake drum, as for holding the mechanism of a press by holding a member such as the belt pulley 10.

For charging and venting the bag 12 a circumferentially spaced set of tubes such as the two shown at 14, 14 are coupled at their inner ends to a fluid-conducting hub member 15 by being merely stuck into respective radial holes in the hub member and provided with respective self-energizing sealing rings 16, 16 mounted in respective grooves in the walls of the respective holes.

To center this manifold-spider assembly while permitting it to rotate with the bag 12 and in relation to the drum 13, the hub member 15 is clamped by means of a centering and clamping ring 17, upon the outer race 18 of preferably a double-row ball bearing or a roller bearing of which the inner race is rigid with a threaded stem 19 which extends from the inner race through a centering washer 20 and is threaded into the end of the shaft 11.

For connecting the fluid-conducting spider hub 15 with a non-rotating fluid-supply conduit 21 a suitable rotary seal 22 has its rotary inner member screwed into the hub 15 and its non-rotary outer member coupled to the pipe 21.

Each of the pipes 14 extends outwardly and at its outer end is coupled to the bag through a suitable threaded-type packing-gland coupling 23a and a quick-release valve 23 of the well known type adapted to open directly to the atmosphere, for quick-venting of the bag, when, by a control valve not shown, the pressure in the supply conduit 21 is lowered.

Quickness of engaging and disengaging the bag in relation to the drum is provided by reason of the plurality of pipes 11 extending to different parts of the circle of the assembly, and also by reason of the small volumetric capacity of the bag that is incident to its shape as shown.

In assembling the parts, the stem 19 of the bearing 18 is stuck through the clamping ring 17 and the centering washer 20 and then is screwed into the shaft 11. The pipes 14, hub 15, sealing rings 16, and rotary seal 22, previously put together as a sub-assembly, is then moved axially into position, the outer ends of the pipes 14 being stuck into the respective couplings 23a in that movement. Then the nuts 23a are tightened and the hub member is secured in its centered position by setting up bolts 17a, 17a, which clamp the centering ring 17 and the hub 15 upon the outer race of the bearing 18. The supply pipe 21, being flexible, can be coupled to the rotary seal 22 either before or after the assembling operations just described.

Although the tubes 14 have only slip-in connection to the hub, they are held in their respective sockets by reason of their having appropriate stiffness and being anchored at their outer ends by the screw-type couplings.

Variations are possible without sacrifice of all of the advantages set out in the above statement of objects and without departure from the scope of the invention as defined in the appended claims.

I claim:

1. An assembly comprising two rotatable and relatively rotatable structures adapted for torque-sustaining frictional engagement with each other, one of said structures comprising fluid-distensible means for effecting such engagement and the other one of said structures comprising a support, means on said support for supplying fluid to the said fluid-distensible means, said fluid-supplying means comprising a fluid-conducting hub member, a rotary seal coupled to said hub member, and a tube connecting said hub member with said fluid-distensible means, the assembly comprising also a journal bearing constituting means for centering the said hub member in relation to and supporting it upon the said other one of the said structures, the said support comprising an end portion of a shaft, and the said journal bearing comprising a bearing element fixedly mounted upon and projecting axially from the end face of and supported by the said end portion of the shaft and constituting the primary support for the said hub member and the said rotary seal.

2. An assembly as defined in claim 1 and comprising a quick-release valve interposed between the recited tube and the recited fluid-distensible means, supported primarily by the one of the recited rotatable structures that comprises the recited fluid-distensible means, and responsive to change of pressure in the said tube for putting said fluid-distensible means in direct communication with the atmosphere.

3. An assembly as defined in claim 1 in which the recited tube has a substantially radial end portion slip-fitted into the recited hub member and an at least approximately axial end portion coupled to the recited fluid-distensible means.

(References on following page)

References Cited in the file of this patent

UNITED STATES PATENTS

| | | |
|---|---|---|
| 1,047,713 | Smith | Dec. 17, 1912 |
| 1,543,889 | Wickes | June 30, 1925 |
| 2,214,164 | Fawick | Sept. 10, 1940 |
| 2,268,143 | Schmitter et al. | Dec. 30, 1941 |
| 2,271,036 | Schmitter et al. | Jan. 27, 1942 |
| 2,304,030 | Schmitter et al. | Dec. 1, 1942 |
| 2,311,597 | Schmitter | Feb. 16, 1943 |
| 2,354,174 | Schmitter | July 18, 1944 |
| 2,437,737 | Halby | Mar. 16, 1948 |
| 2,586,617 | Danly | Feb. 19, 1952 |